(12) United States Patent
Nakagawa et al.

(10) Patent No.: US 12,441,043 B2
(45) Date of Patent: Oct. 14, 2025

(54) DRIVE MECHANISM, INJECTION APPARATUS, AND INJECTION MOLDING MACHINE

(71) Applicant: THE JAPAN STEEL WORKS, LTD., Tokyo (JP)

(72) Inventors: Yutaka Nakagawa, Tokyo (JP); Yusuke Yonehara, Tokyo (JP); Toshio Toyoshima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 131 days.

(21) Appl. No.: 18/235,831

(22) Filed: Aug. 19, 2023

(65) Prior Publication Data

US 2024/0075668 A1    Mar. 7, 2024

(30) Foreign Application Priority Data

Sep. 1, 2022    (JP) .................................. 2022-139382

(51) Int. Cl.
     *B29C 45/50*          (2006.01)

(52) U.S. Cl.
     CPC .. *B29C 45/5008* (2013.01); *B29C 2045/5068* (2013.01); *B29C 2045/5088* (2013.01)

(58) Field of Classification Search
     CPC ..................... B29C 45/5008; B29C 2045/5068
     See application file for complete search history.

(56) References Cited

U.S. PATENT DOCUMENTS 3,908,968 A * 9/1975 Bielfeldt ............. B29C 45/5008
                                                   366/78
4,005,641 A * 2/1977 Nussbaumer ....... B29C 45/5008
                                                   92/33

(Continued)

FOREIGN PATENT DOCUMENTS

DE         3937099 A1 * 5/1990 ......... B29C 45/5008
EP          0021249 A1 * 1/1981 ......... B29C 45/1775
(Continued)

OTHER PUBLICATIONS

Machine translation EP0021249A1 (Year: 1981).*

(Continued)

*Primary Examiner* — Abbas Rashid
*Assistant Examiner* — Wayne K. Swier
(74) *Attorney, Agent, or Firm* — Potomac Law Group, PLLC

(57) ABSTRACT

An injection apparatus of one embodiment includes a cylinder, a screw, and a drive mechanism configured to drive the screw. The drive mechanism includes a piston having a hollow piston rod, a connection rod having one end side inserted into the piston rod, the connection rod being rotatable with respect to the piston and movable integrally with the piston in a direction of a central axis of the piston rod, and a rotating body which is arranged around the connection rod and is driven to rotate around a central axis of the connection rod as a rotation axis. A plurality of external teeth are provided on the connection rod, and a plurality of internal teeth meshing with the external teeth are provided on the rotating body. Also, the screw is non-rotatably connected to the other end side of the connection rod protruding from the piston rod.

6 Claims, 2 Drawing Sheets

(56) References Cited

U.S. PATENT DOCUMENTS

Figure 1:
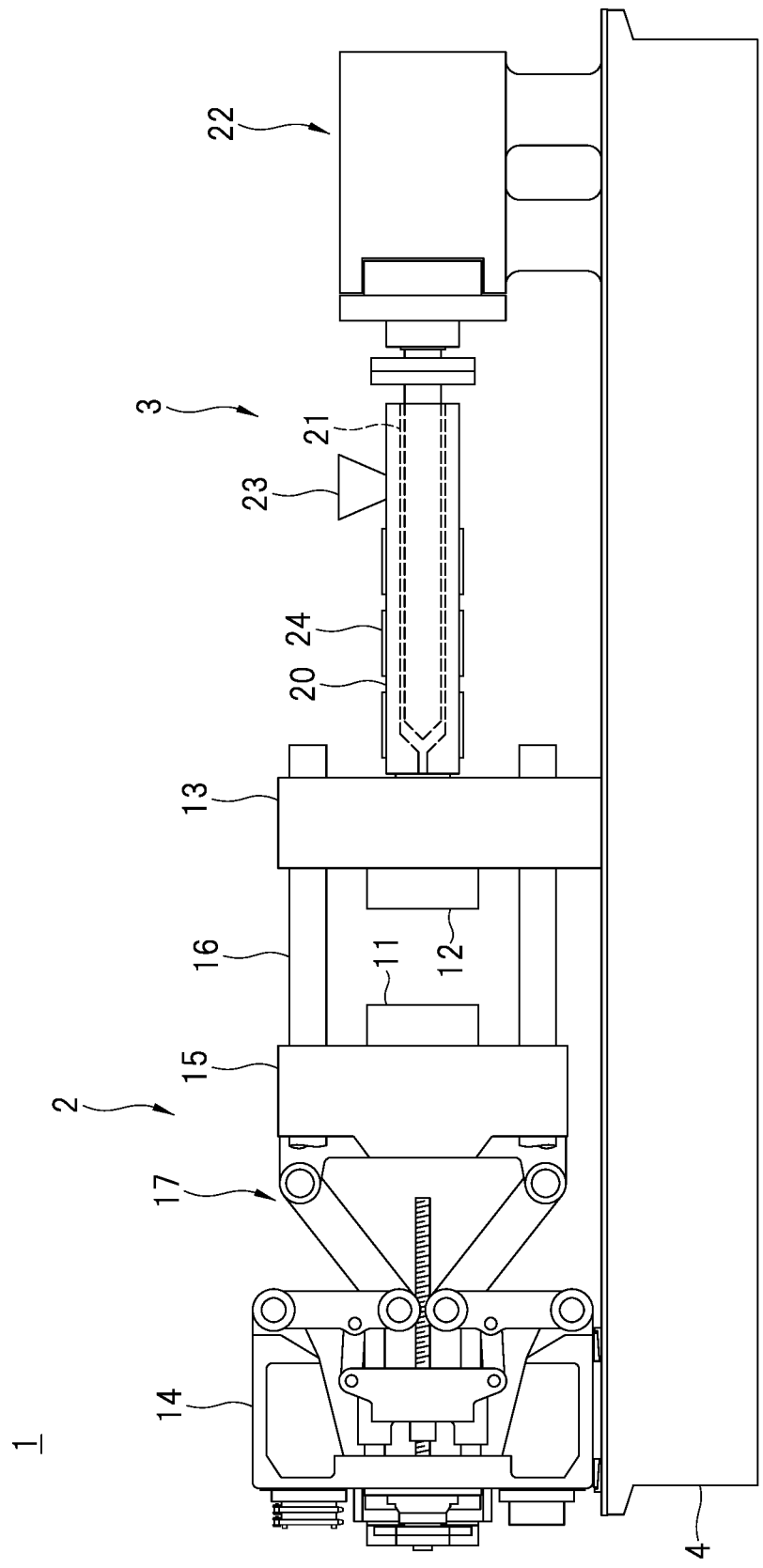

| | | | | |
|---|---|---|---|---|
| 4,824,255 A | * | 4/1989 | Wohlrab | ............. B29C 45/5008 366/100 |
| 2010/0062095 A1 | * | 3/2010 | Cadonau | ............... G01L 5/0042 425/170 |

FOREIGN PATENT DOCUMENTS

| | | | | | |
|---|---|---|---|---|---|
| EP | 2121279 B1 | * | 4/2013 | ........... | G01L 5/0042 |
| JP | H03213323 A | * | 9/1991 | ......... | B29C 45/5008 |
| JP | H0477226 A | * | 3/1992 | ............. | B29C 45/50 |
| JP | 2000117789 A | * | 4/2000 | ........ | B29C 45/5008 |
| JP | 2019-171784 A | | 10/2019 | | |

OTHER PUBLICATIONS

Machine translation DE3937099A1 (Year: 1990).*
Machine translation JPH03213323A (Year: 1991).*
Machine translation JPH0477226A (Year: 1992).*
Machine translation JP2000117789A (Year: 2000).*
Machine translation EP2121279B1 (Year: 2013).*

* cited by examiner

DRIVE MECHANISM, INJECTION APPARATUS, AND INJECTION MOLDING MACHINE

CROSS-REFERENCE TO RELATED APPLICATION

The present application claims priority from Japanese Patent Application No. 2022-139382 filed on Sep. 1, 2022, the contents of which are hereby incorporated by reference into this application.

TECHNICAL FIELD OF THE INVENTION

The present invention relates to an injection molding machine.

BACKGROUND OF THE INVENTION

An injection molding machine configured to manufacture a resin member or a metal member with a desired shape has been known. A general injection molding machine includes a mold clamping apparatus and an injection apparatus. The mold clamping apparatus holds molds and is configured to open and close the held molds. The injection apparatus is configured to melt a resin material or a metal material and supply the molten material to the mold clamping apparatus (see, for example, Japanese Unexamined Patent Application Publication No. 2019-171784 (Patent Document 1)).

SUMMARY OF THE INVENTION

The injection apparatus includes a cylinder, a screw, a drive mechanism, and the like. The drive mechanism rotates the screw, moves the screw forward, and moves the screw backward inside the cylinder. In order to reduce the size of the injection apparatus and the injection molding machine, there is a demand for reducing the size of the drive mechanism provided in the injection apparatus.

Other objects and novel features will be apparent from the description of this specification and the accompanying drawings.

An injection apparatus of one embodiment includes a cylinder, a screw provided inside the cylinder, and a drive mechanism configured to rotate the screw, move the screw forward, and move the screw backward. The drive mechanism includes a piston having a hollow piston rod, a connection rod having one end side inserted into the piston rod, the connection rod being rotatable with respect to the piston and moving integrally with the piston in a direction of a central axis of the piston rod, and a rotating body which is arranged around the connection rod and is driven to rotate around a central axis of the connection rod as a rotation axis. A plurality of external teeth extending in a direction of the central axis of the connection rod are provided on the connection rod, and a plurality of internal teeth meshing with the external teeth are provided on the rotating body. Also, the screw is non-rotatably connected to the other end side of the connection rod protruding from the piston rod.

According to one embodiment, it is possible to reduce the size of the injection apparatus and the injection molding machine.

BRIEF DESCRIPTIONS OF THE DRAWINGS

Figure 2:
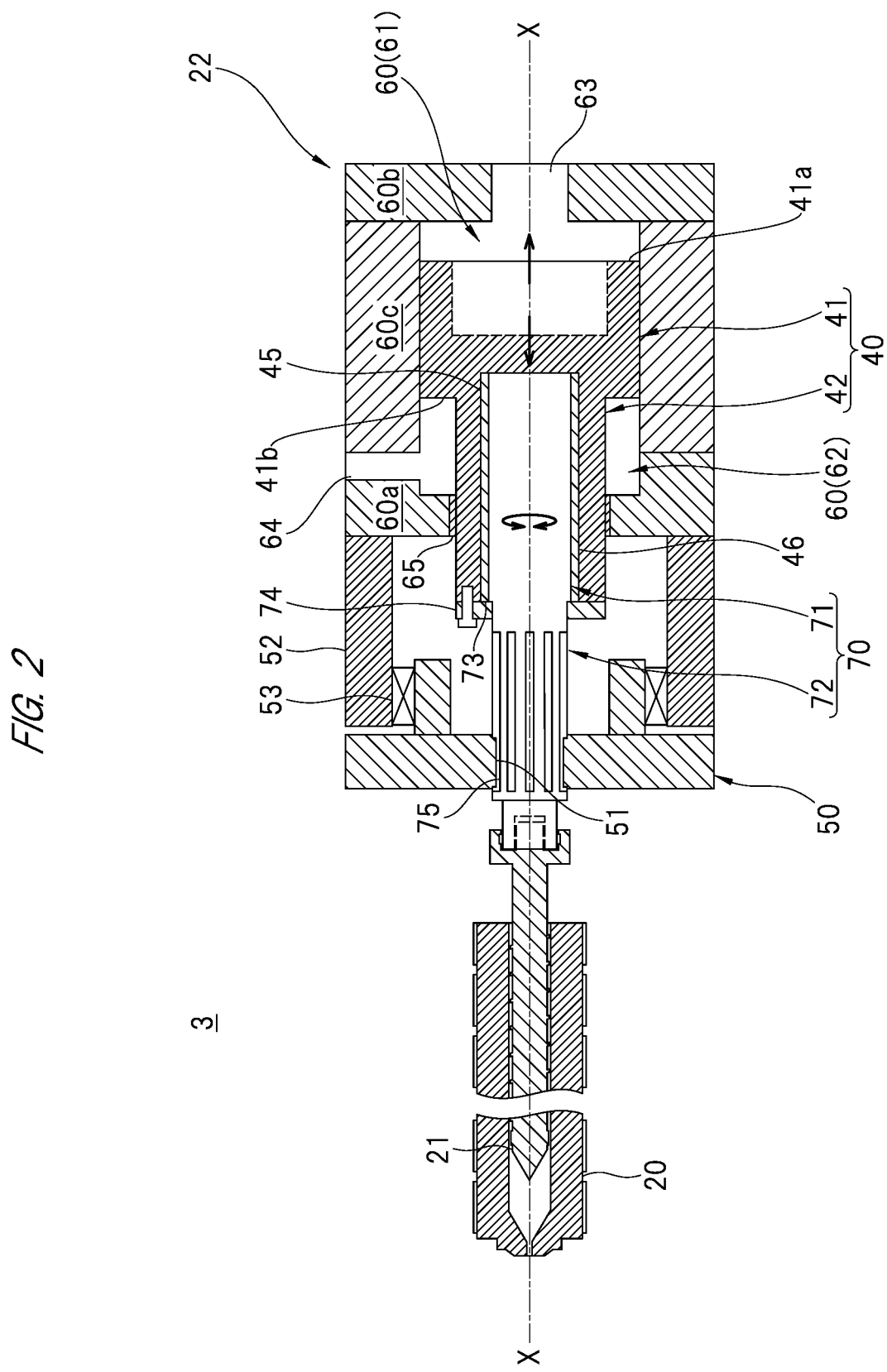

FIG. 1 is an explanatory diagram schematically showing an injection molding machine according to an embodiment; and FIG. 2 is an explanatory diagram schematically showing an injection apparatus according to the embodiment.

DESCRIPTIONS OF THE PREFERRED EMBODIMENTS

Hereinafter, an embodiment will be described in detail with reference to drawings. Note that the members and devices having the same or substantially same function are denoted by the same reference characters throughout the drawings for describing the embodiment. Also, the repetitive description of the members and devices that have been described once will be omitted in principle.

<Injection Molding Machine>

FIG. 1 is an explanatory diagram schematically showing an injection molding machine 1 according to the present embodiment. The injection molding machine 1 includes a mold clamping apparatus 2 and an injection apparatus 3. Molds 11 and 12 are attached to the mold clamping apparatus 2. The mold clamping apparatus 2 opens and closes the attached molds 11 and 12. The injection apparatus 3 heats a material (for example, metal material such as magnesium or magnesium alloy) into a molten or semi-molten state. Further, the injection apparatus 3 supplies the metal material in the molten or semi-molten state (molten metal) to the mold clamping apparatus 2. More specifically, the injection apparatus 3 injects the molten metal into a cavity of the molds 11 and 12. Namely, the injection molding machine 1 according to the present embodiment is a metal injection molding machine.

<Mold Clamping Apparatus>

The mold clamping apparatus 2 includes a fixed platen 13, a mold clamping housing 14, and a movable platen 15 provided on a bed 4. The fixed platen 13 is fixed to the bed 4. On the other hand, the mold clamping housing 14 and the movable platen 15 are slidable on the bed 4.

The fixed platen 13 and the mold clamping housing 14 are connected to each other by a plurality of tie bars 16 passing through the movable platen 15. More specifically, the fixed platen 13 and the mold clamping housing 14 are connected by the four tie bars 16. The movable platen 15 is slidable between the fixed platen 13 and the mold clamping housing 14 in the opposing direction thereof.

A mold clamping mechanism 17 is provided between the mold clamping housing 14 and the movable platen 15. More specifically, the link-type mold clamping mechanism 17 is provided between the mold clamping housing 14 and the movable platen 15. From another point of view, a toggle mechanism is provided between the mold clamping housing 14 and the movable platen 15. Note that the mold clamping mechanism 17 may be replaced with a direct-pressure type.

The mold clamping mechanism 17 moves the mold 11 attached to the movable platen 15 forward and backward with respect to the mold 12 attached to the fixed platen 13. When the mold 11 comes in contact with the mold 12, the molds 11 and 12 are closed. On the other hand, when the mold 11 is separated from the mold 12, the molds 11 and 12 are opened. The mold clamping mechanism 17 can press the mold 11 to the mold 12 such that the molds 11 and 12 do not open while the molds 11 and 12 are closed.

<Injection Apparatus>

The injection apparatus 3 includes a cylinder 20, a screw 21, a drive mechanism 22, a hopper 23, and the like. The hopper 23 is a supply port for supplying a metal material into the cylinder 20 and is provided on a rear part of the cylinder 20. The screw 21 is provided inside the cylinder 20, and rotates and moves with respect to the cylinder 20. More specifically, the screw 21 is driven to rotate around a central axis of the cylinder as a rotation axis. Further, the screw 21 is linearly driven in the direction of the central axis of the cylinder 20. From another point of view, the screw 21 is linearly driven inside the cylinder 20 in the direction toward the mold clamping apparatus 2 (forward direction) and the direction away from the mold clamping apparatus 2 (backward direction).

The above-described operations (rotation, forward movement, backward movement) of the screw 21 are realized by the drive mechanism 22. Details of the drive mechanism 22 will be described later.

The metal material supplied into the cylinder 20 through the hopper 23 is melted by heating. A heater for heating the cylinder 20 is provided around the cylinder 20. In the present embodiment, a plurality of heaters 24 are wound around the outer peripheral surface of the cylinder 20. The metal material supplied into the cylinder 20 is heated and melted by the heat generated from the heaters 24 and the shear heat generated by the rotation of the screw 21.

<Method of Manufacturing Molded Product>

The process of manufacturing a molded product such as a metal member by using the injection molding machine 1 shown in FIG. 1 is the same or substantially same as the well-known process. Therefore, the detailed description of the manufacturing process is omitted, but the manufacturing process includes one or two or more steps of the following steps.

(Step 1) A step of heating a metal material (for example, magnesium or magnesium alloy processed into powder or pellets) supplied into the cylinder 20 into a molten or semi-molten state.

(Step 2) A step of rotating the screw 21 to send the metal material in the molten or semi-molten state to a distal end side of the cylinder 20.

(Step 3) A step of moving the screw 21 forward to inject the metal material into a cavity of the molds 11 and 12 from an injection nozzle.

(Step 4) A step of moving the screw 21 backward to relieve the pressure of the metal material in the injection nozzle.

By repeating the process including one or two or more steps of the steps described above, metal members (molded products) with the same shape are continuously manufactured. Namely, the metal members (molded products) with a desired shape are mass-produced.

<Drive Mechanism>

FIG. 2 is an explanatory diagram schematically showing the injection apparatus 3. As described above, the injection apparatus 3 includes the drive mechanism 22 configured to rotate the screw 21, move the screw 21 forward, and move the screw 21 backward. The drive mechanism 22 includes a piston 40, a rotating body 50, and a connection rod 70.

<Piston>

The piston 40 includes a piston head 41 and a piston rod 42 integrated with each other and is hydraulically moved in a direction of a central axis of the piston rod 42. Namely, the piston 40 is a hydraulic piston. Note that the line X-X in FIG. 2 is a virtual line indicating the central axes of the piston rod 42 and the connection rod 70.

From another point of view, the piston 40 moves in the direction toward the mold clamping apparatus 2 shown in FIG. 1 (forward direction) and the direction away from the mold clamping apparatus 2 (backward direction). The screw 21 is connected to the piston 40 via the connection rod 70. Therefore, when the piston 40 moves back and forth, the screw 21 also moves back and forth. More specifically, when the piston 40 moves forward, the screw 21 also moves forward. On the other hand, when the piston moves backward, the screw 21 also moves backward.

The piston 40 is moved forward, for example, when executing Step 3 above. In other words, in Step 3 above, the piston 40 is moved forward to move the screw 21 forward, thereby injecting the metal material from the injection nozzle.

The piston 40 is moved backward, for example, when executing Step 4 above. In other words, in Step 4 above, the piston 40 is moved backward to move the screw 21 backward, thereby relieving the pressure of the metal material in the injection nozzle. By relieving the pressure of the metal material in the injection nozzle, leakage of the metal material is prevented. The Step 4 above in which the screw 21 is moved backward in order to prevent the leakage of the metal material is sometimes referred to as "suckback".

<Piston Head>

The piston head 41 is housed in a hydraulic chamber 60 surrounded by a front wall 60a, a rear wall 60b, and side walls 60c. The piston head 41 can move forward and backward and rotate inside the hydraulic chamber 60.

The hydraulic chamber 60 is divided into an upper chamber 61 and a lower chamber 62 by the piston head 41. From another point of view, the space behind (on the right side of) the piston head 41 is the upper chamber 61, and the space in front of (on the left side of) the piston head 41 is the lower chamber 62. Note that the volumes of the upper chamber 61 and the lower chamber 62 increase and decrease as the piston head 41 moves.

The hydraulic chamber 60 is connected to a hydraulic system via two ports 63 and 64. When hydraulic oil is supplied from the port 63 to the upper chamber 61, a pressure is applied to an upper surface 41a of the piston head 41, and the piston 40 moves forward (the piston 40 is pushed out). At this time, hydraulic oil in the lower chamber 62 is discharged from the lower chamber 62 through the port 64.

On the other hand, when hydraulic oil is supplied from the port 64 to the lower chamber 62, a pressure is applied to a lower surface 41b of the piston head 41, and the piston 40 moves backward (the piston 40 is pushed back). At this time, hydraulic oil in the upper chamber 61 is discharged from the upper chamber 61 through the port 63.

<Piston Rod>

The piston rod 42 is hollow. More specifically, the piston rod 42 has a cylindrical shape with one end (proximal end side) closed by the piston head 41. From another point of view, the piston rod 42 extends forward from the lower surface 41b of the piston head 41. Further, an insertion hole 45 extending in the direction of the central axis is provided inside the piston rod 42, and a bottom of the insertion hole 45 is closed by the piston head 41.

In other words, the piston head 41 is provided on a proximal end side of the piston rod 42. Namely, the side where the piston head 41 is provided is the proximal end side of the piston rod 42. Also, the side opposite to the side where the piston head 41 is provided is a distal end side of the piston rod 42. Note that the piston head 41 and the piston rod 42 are coaxial with each other.

The piston rod 42 penetrates the front wall 60a and protrudes forward from the front wall 60a. A seal member 65 for preventing leakage of hydraulic oil is arranged between the front wall 60a and the piston rod 42.

<Connection Rod>

The connection rod 70 has a columnar shape. One end side (proximal end side) of the connection rod 70 is inserted into the insertion hole 45 of the piston rod 42, and the other end side (distal end side) of the connection rod 70 protrudes from the piston rod 42. In the following description, the proximal end side of the connection rod 70 inserted into the piston rod 42 is referred to as an "insertion portion 71" and the distal end side of the connection rod 70 protruding from the piston rod 42 is referred to as a "protruding portion 72" in some cases for distinction.

An outer diameter of the insertion portion 71 of the connection rod 70 is larger than that of the protruding portion 72. As a result, there is a step between the insertion portion 71 and the protruding portion 72. Namely, the connection rod 70 is a stepped rod. From another point of view, a distal end surface of the insertion portion 71 extends outward in a radial direction of the protruding portion 72 to form a flange portion 73.

The connection rod 70 is rotatable with respect to the piston rod 42. More specifically, the insertion portion 71 of the connection rod 70 is rotatably inserted into the insertion hole 45 of the piston rod 42. Note that a bearing 46 is arranged between an inner peripheral surface of the insertion hole 45 and an outer peripheral surface of the insertion portion 71. The bearing 46 rotatably supports the connection rod 70 and aligns the central axes of the piston rod 42 and the connection rod 70. In other words, the bearing 46 centers the connection rod 70. The bearing 46 may be a sliding bearing or a rolling bearing, but a sliding bearing is preferable from the viewpoint of centering accuracy.

On the other hand, the connection rod 70 cannot move back and forth with respect to the piston rod 42. More specifically, a retainer ring 74 bestriding a distal end surface of the piston rod 42 and the flange portion 73 of the connection rod 70 is bolted to the piston rod 42. Also, a rear end surface of the connection rod 70 abuts on the bottom of the insertion hole 45.

In other words, the piston 40 and the connection rod 70 can rotate relative to each other, and move integrally in the front-rear direction (direction of the central axis).

A plurality of external teeth 75 are provided on an outer peripheral surface of the connection rod 70. More specifically, the plurality of external teeth 75 are provided on an outer peripheral surface of the protruding portion 72 of the connection rod 70 protruding from the piston rod 42.

Each external tooth 75 extends in the direction of the central axis of the connection rod 70. Also, the plurality of external teeth 75 are adjacent in a circumferential direction of the connection rod 70 and parallel to each other.

<Rotating Body>

The rotating body 50 is arranged around the connection rod 70 and surrounds the connection rod 70. More specifically, the rotating body 50 is arranged around the protruding portion 72 and surrounds the protruding portion 72. Namely, the rotating body 50 is an annular or cylindrical member having an inner diameter through which the protruding portion 72 of the connection rod 70 can be inserted.

The rotating body 50 is arranged on a front side of the injection apparatus 3. More specifically, the rotating body 50 is arranged between the proximal end and the distal end of the connection rode 70 in the direction of the central axis of the connection rode 70. From another point of view, the rotating body 50 is arranged in front of the piston 40 and behind the screw 21.

A plurality of internal teeth 51 are provided on an inner peripheral surface of the rotating body 50 facing the outer peripheral surface of the connection rod 70. Each internal tooth 51 extends in the same direction as the external tooth 75. In addition, the plurality of internal teeth 51 are adjacent to each other in a circumferential direction (rotation direction) of the rotating body 50 and parallel to each other.

The internal teeth 51 provided on the rotating body 50 mesh with the external teeth 75 provided on the connection rod 70. Namely, the rotating body 50 and the connection rod 70 are spline-fitted. From another point of view, the connection rod 70 is a spline shaft with a key formed on its outer peripheral surface, and the rotating body 50 is a spline boss or sleeve with a key groove formed on its inner peripheral surface.

The external teeth 75 provided on the connection rod 70 and the internal teeth 51 provided on the rotating body 50 extend in the direction of the central axis of the connection rod 70 and mesh with each other. Therefore, the connection rod 70 and the rotating body 50 cannot rotate relative to each other, but the connection rod 70 can move in the direction of the central axis with respect to the rotating body 50. Namely, the connection rod 70 can rotate integrally with the rotating body 50 and can move back and forth independently of the rotating body 50.

Further, as described above, the piston 40 and the connection rod 70 can rotate relative to each other, and the connection rod 70 can move integrally with the piston 40 in the direction of the central axis. As a result, the rotating body 50 and the connection rod 70 can integrally rotate independently of the piston 40. On the other hand, the piston 40 and the connection rod 70 can integrally move back and forth independently of the rotating body 50.

The rotating body 50 is rotatably attached via a bearing 53 to a support portion 52 protruding from a front surface of the front wall 60a. The rotating body 50 is driven to rotate by a motor around the central axis of the connection rod 70 as a rotation axis. For example, torque output from an electric motor is input to the rotating body 50 via transmission means and deceleration means composed of belts, pulleys, gears, and the like. The torque input to the rotating body 50 is transmitted to the connection rod 70 and rotates the connection rod 70. At this time, the piston 40 does not rotate. Note that the motor is not limited to an electric motor, and may be, for example, a hydraulic motor.

As described above, the screw 21 is connected to the piston via the connection rod 70. More specifically, the screw 21 is non-rotatably connected to the distal end of the protruding portion 72 of the connection rod 70. Therefore, when the connection rod 70 rotates, the screw 21 also rotates. More specifically, when the connection rod 70 rotates clockwise, the screw 21 also rotates clockwise. On the other hand, when the connection rod 70 rotates counterclockwise, the screw 21 also rotates counterclockwise. The rotation direction of the connection rod 70 is switched by switching the rotation direction of the rotating body 50, and the rotation direction of the rotating body 50 is switched by switching the rotation direction of the motor.

The connection rod 70 is rotated, for example, when executing Step 1 or Step 2 above. Namely, in Step 1 above, the connection rod 70 is rotated to rotate the screw 21, thereby applying shear stress to the metal material. Further, in step 2 above, the rotation rod 70 is rotated to rotate the screw 21, thereby sending the metal material to the distal end side of the cylinder 20.

As described above, in the injection apparatus 3 of the present embodiment, the rotating body 50 for rotating the connection rod 70 is arranged on the front side of the apparatus, and the external teeth 75 meshing with the internal teeth 51 of the rotating body 50 are provided on the distal end side of the connection rod 70. On the other hand, if the rotating body 50 is arranged on the rear side of the apparatus, the connection rod 70 and the piston 40 must be extended backward, and the external teeth 75 must be provided on the proximal end side of the connection rod 70 and behind the piston head 41. In this case, the entire length of the injection apparatus 3 is extended and the size of the injection apparatus 3 is increased. Furthermore, the increase in size of the injection apparatus 3 leads to the increase in size of the injection molding machine 1 including the injection apparatus 3. Namely, in the present embodiment, the size reduction of the injection apparatus 3 and the injection molding machine 1 is realized.

Further, in the injection apparatus 3 of the present embodiment, members that move when the screw 21 moves forward and backward are only the screw 21, the piston 40, and the connection rod 70. From another point of view, the rotating body 50 does not move when the screw 21 moves forward and backward. Therefore, the weight to be moved forward and backward is small, and the braking performance of the screw 21 is improved. In other words, the braking distance of the screw 21 can be shortened, and the screw 21 can be accurately stopped at a desired position.

Furthermore, the piston 40 moves back and forth but does not rotate. Therefore, the seal member provided on the piston is slid only in the front-rear direction. As a result, breakage and deterioration of the seal member provided on the piston 40 are prevented or suppressed as compared with the case where the piston 40 rotates. For example, breakage and deterioration of the seal member 65 arranged between the piston rod 42 and the front wall 60a are prevented or suppressed.

In the foregoing, the invention made by the inventors of this application has been concretely described based on the embodiment. However, it is needless to say that the present invention is not limited to the above-described embodiment and various modifications can be made within the range not departing from the gist thereof. For example, the injection apparatus 3 can be replaced with an injection apparatus (resin injection apparatus) configured to inject molten resin into the molds 11 and 12 attached to the mold clamping apparatus 2.

What is claimed is:

1. A drive mechanism configured to drive a screw of an injection apparatus, the drive mechanism comprising:
   a piston which includes a piston head and a hollow piston rod extending from the piston head in a first direction and is hydraulically moved in a direction of a central axis of the piston rod;
   a connection rod rotatable with respect to the piston and moving integrally with the piston in the direction of the central axis of the piston rod; and
   a rotating body which is driven to rotate around a central axis of the connection rod as a rotation axis,
   wherein the connection rod includes an insertion portion rotatably inserted into an insertion hole provided in the piston rod and a protruding portion protruding from the insertion hole in the first direction,
   wherein the rotating body is arranged around the protruding portion of the connection rod,
   wherein a plurality of external teeth extending in a direction of the central axis of the connection rod are provided on the protruding portion of the connection rod,
   wherein a plurality of internal teeth meshing with the external teeth are provided on the rotating body, and
   wherein the screw is non-rotatably connected to an end of the protruding portion of the connection rod.

2. The drive mechanism according to claim 1,
   wherein the connection rod has a columnar shape,
   wherein the rotating body has an annular or cylindrical shape surrounding the connection rod,
   wherein the external teeth are provided on an outer peripheral surface of the connection rod, and
   wherein the internal teeth are provided on an inner peripheral surface of the rotating body facing the outer peripheral surface of the connection rod.

3. The drive mechanism according to claim 2,
   wherein the plurality of external teeth are adjacent in a circumferential direction of the connection rod and parallel to each other, and
   wherein the plurality of internal teeth are adjacent in a circumferential direction of the rotating body and parallel to each other.

4. The drive mechanism according to claim 1,
   wherein the rotating body is arranged between one end and the other end of the protruding portion in the direction of the central axis of the connection rod.

5. An injection apparatus configured to melt a material and inject the molten material, the injection apparatus comprising:
   a cylinder;
   a screw provided inside the cylinder; and
   a drive mechanism configured to rotate the screw, move the screw forward, and move the screw backward,
   wherein the drive mechanism includes:
     a piston which includes a piston head and a hollow piston rod extending from the piston head in a first direction and is hydraulically moved in a direction of a central axis of the piston rod;
     a connection rod rotatable with respect to the piston and moving integrally with the piston in the direction of the central axis of the piston rod; and
     a rotating body which is driven to rotate around a central axis of the connection rod as a rotation axis,
   wherein the connection rod includes an insertion portion rotatably inserted into an insertion hole provided in the piston rod and a protruding portion protruding from the insertion hole in the first direction,
   wherein the rotating body is arranged around the protruding portion of the connection rod,
   wherein a plurality of external teeth extending in a direction of the central axis of the connection rod are provided on the protruding portion of the connection rod,
   wherein a plurality of internal teeth meshing with the external teeth are provided on the rotating body, and
   wherein the screw is non-rotatably connected to an end of the protruding portion of the connection rod.

6. An injection molding machine comprising:
   a mold clamping apparatus to which molds can be attached; and
   an injection apparatus configured to inject molten metal or molten resin into the molds,
   wherein the injection apparatus includes:
     a cylinder;
     a screw provided inside the cylinder; and
     a drive mechanism configured to rotate the screw, move the screw forward, and move the screw backward,
   wherein the drive mechanism includes:
     a piston which includes a piston head and a hollow piston rod extending from the piston head in a first direction and is hydraulically moved in a direction of a central axis of the piston rod;

a connection rod rotatable with respect to the piston and moving integrally with the piston in the direction of the central axis of the piston rod; and a rotating body which is driven to rotate around a central axis of the connection rod as a rotation axis, wherein the connection rod includes an insertion portion rotatably inserted into an insertion hole provided in the piston rod and a protruding portion protruding from the insertion hole in the first direction, wherein the rotating body is arranged around the protruding portion of the connection rod, wherein a plurality of external teeth extending in a direction of the central axis of the connection rod are provided on the protruding portion of the connection rod, wherein a plurality of internal teeth meshing with the external teeth are provided on the rotating body, and wherein the screw is non-rotatably connected to an end of the protruding portion of the connection rod.

\* \* \* \* \*